United States Patent
Noda et al.

(10) Patent No.: US 9,294,863 B2
(45) Date of Patent: Mar. 22, 2016

(54) ACOUSTIC DEVICE, AUGMENTED REALITY ACOUSTIC DEVICE, ACOUSTIC SYSTEM, ACOUSTIC PROCESSING METHOD, AND RECORDING MEDIUM

(71) Applicant: FUJITSU LIMITED, Kawasaki-shi, Kanagawa (JP)

(72) Inventors: Masahide Noda, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 14/479,756

(22) Filed: Sep. 8, 2014

(65) Prior Publication Data
US 2015/0104049 A1  Apr. 16, 2015

(30) Foreign Application Priority Data
Oct. 15, 2013 (JP) ................. 2013-215111

(51) Int. Cl.
*H04R 5/02* (2006.01)
*H04S 7/00* (2006.01)
*G06F 3/01* (2006.01)
*G06F 1/16* (2006.01)

(52) U.S. Cl.
CPC .............. *H04S 7/302* (2013.01); *G06F 1/1694* (2013.01); *G06F 3/011* (2013.01); *G06F 3/012* (2013.01); *G06F 3/017* (2013.01); *G06F 2200/1637* (2013.01)

(58) Field of Classification Search
CPC ....... H04S 7/302; G06F 1/1694; G06F 3/011; G06F 3/012; G06F 3/017; G06F 2200/1637; G06F 3/0346
USPC ................................................... 381/303, 310
See application file for complete search history.

(56) References Cited

U.S. PATENT DOCUMENTS

| | | | |
|---|---|---|---|
| 6,606,111 B1 | 8/2003 | Kondo et al. | |
| 2014/0375683 A1* | 12/2014 | Salter | G06F 3/013 345/633 |

FOREIGN PATENT DOCUMENTS

| | | |
|---|---|---|
| JP | 2005-316704 | 11/2005 |
| JP | 2006-277192 | 10/2006 |
| JP | 4465880 | 5/2010 |
| WO | 00/22823 | 4/2000 |

* cited by examiner

Primary Examiner — Vivian Chin
Assistant Examiner — Ammar Hamid
(74) *Attorney, Agent, or Firm* — Fujitsu Patent Center

(57) ABSTRACT

An acoustic device includes: a memory; and a processor coupled to the memory. The processor executes a process including: first determining, based on a state of a user, an arbitrary object from among objects around the user as an object that is watched by the user; second determining the watched object as a target when a predetermined determination time elapses from a timing at which the arbitrary object is determined as the watched object; generating, when the watched object is determined as the target, acoustic signals for outputting audio of a sound generator corresponding to the target in association with a position of the target; and making, based on a difference between a moving direction of the user and a direction of a body of the user, an adjustment to reduce remaining time until when the predetermined determination time elapses.

12 Claims, 13 Drawing Sheets

FIG.4

| OBJECT ID (251A) | OBJECT POSITION (251B) | DETER-MINA-TION TIME (251C) | SOUND GENERATOR FILE (251G) | | |
|---|---|---|---|---|---|
| | | | NORMAL STATE (251E) | DURING DETERMINATION (251D) | AFTER DETERMINATION (251F) |
| ID1 | (Xm1, Ym1) | 10 sec. | THIS IS AIR CONDITIONER | WILL YOU ADJUST ROOM TEMPERATURE? | OPERATE REMOTE CONTROLLER |
| ID2 | (Xm2, Ym2) | 20 sec. | THIS IS LUMINAIRE | WILL YOU TURN ON LUMINAIRE? | TURN ON SWITCH ON WALL |
| ⋮ | ⋮ | ⋮ | ⋮ | ⋮ | ⋮ |

FIG.5

| OBJECT ID (252A) | OBJECT POSITION (252B) | DETERMINATION TIME (252C) |
|---|---|---|
| ID1 | (Xm1, Ym1) | 10 sec. |
| | | |
| | | |
| | | |
| | | |

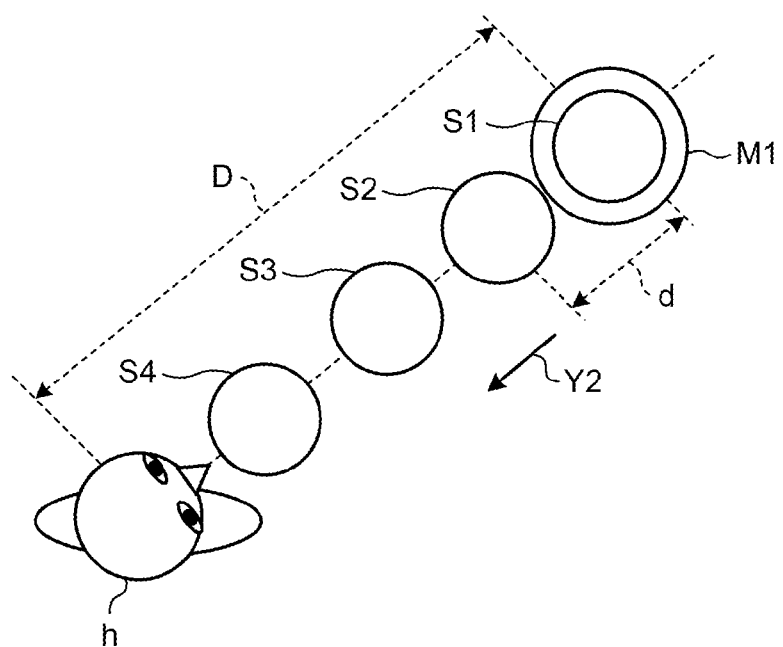

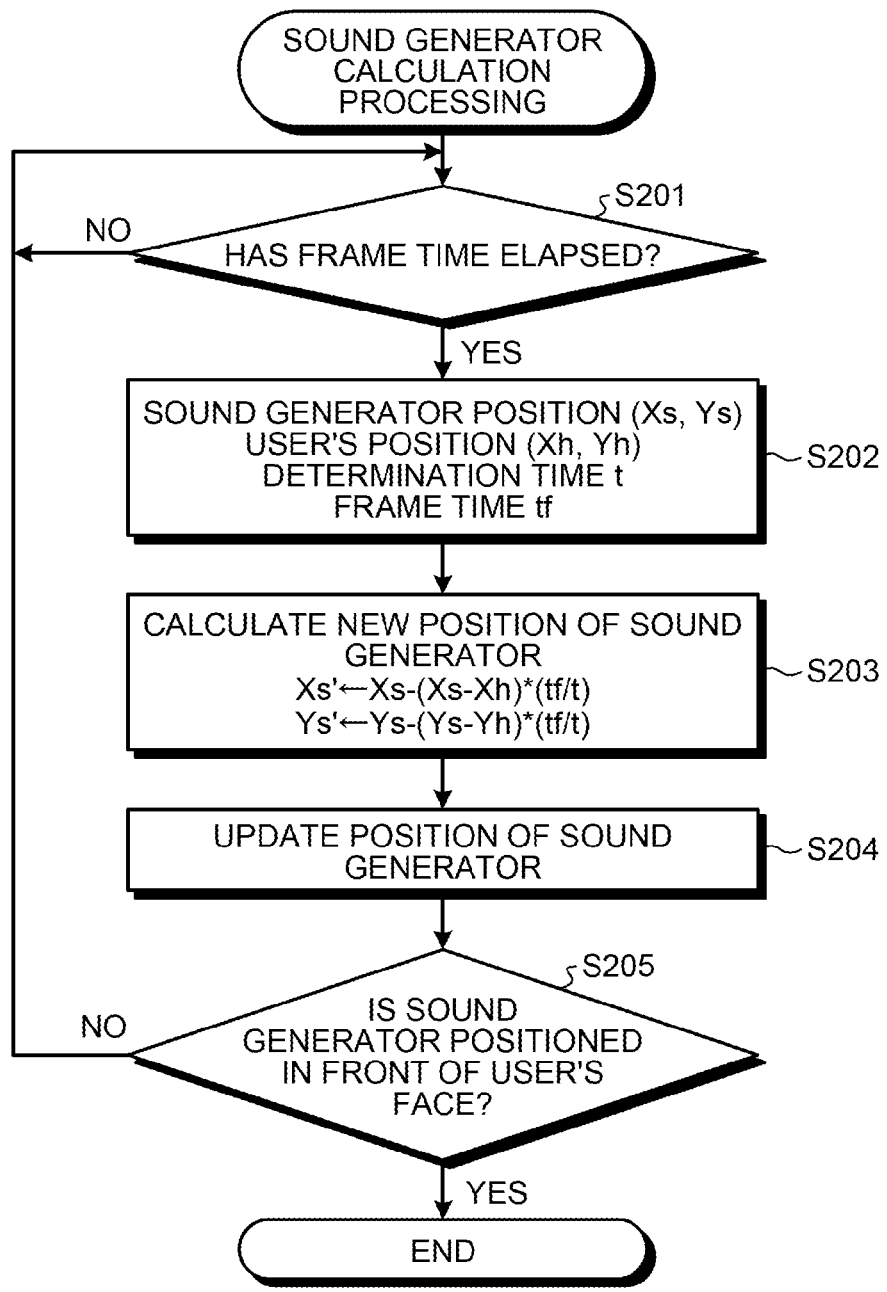

ACOUSTIC DEVICE, AUGMENTED REALITY ACOUSTIC DEVICE, ACOUSTIC SYSTEM, ACOUSTIC PROCESSING METHOD, AND RECORDING MEDIUM

CROSS-REFERENCE TO RELATED APPLICATION

This application is based upon and claims the benefit of priority of the prior Japanese Patent Application No. 2013-215111, filed on Oct. 15, 2013, the entire contents of which are incorporated herein by reference.

FIELD

The embodiment discussed herein is related to an acoustic device, an augmented reality acoustic device, an acoustic system, an acoustic processing method, and recording medium.

BACKGROUND

Stereophonic acoustic devices are known that virtually localize a sound generator in a desired position and output 3D audio from the sound generator. Stereophonic acoustic devices like those described above are also known that virtually localize a sound generator of an object around a user in the actual position of the object and provides the user with guidance audio regarding the object from the sound generator.

Patent Document 1: International Publication Pamphlet No. WO 2000/022823
Patent Document 2: Japanese Laid-open Patent Publication No. 2006-277192

When an object from among objects around a user is determined as a target for which the user requests stereophonic acoustic guidance audio, such a stereophonic acoustic device implements outputting of stereophonic acoustic guidance about the target. For example, the stereophonic acoustic device determines, as a target, an object that is watched continuously for a predetermined period of time from among objects that are to be watched and present in the moving direction of the user.

Because the determination time until when an object is determined as a target for which stereophonic guidance audio is requested is constant, a predetermined determination time is requested to determine an object as a target even if the user is watching the object and thus it is clear that the object is the target.

An object herein is, according to an aspect, to provide an acoustic device, an augmented reality acoustic device, an acoustic system, an acoustic processing method, and recording medium that make it possible to quickly determine a target for which stereophonic acoustic guidance audio is requested.

SUMMARY

According to an aspect of the embodiments, an acoustic device includes: a memory; and a processor coupled to the memory, wherein the processor executes a process including: first determining, based on a state of a user, an arbitrary object from among objects around the user as an object that is watched by the user; second determining the watched object as a target when a predetermined determination time elapses from a timing at which the arbitrary object is determined as the watched object; generating, when the watched object is determined as the target, acoustic signals for outputting audio of a sound generator corresponding to the target in association with a position of the target; and making, based on a difference between a moving direction of the user and a direction of a body of the user, an adjustment to reduce remaining time until when the predetermined determination time elapses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an exemplary sound generator table;
FIG. 5 illustrates an exemplary determination time table;
FIG. 12 illustrates exemplary operations performed when the position of a sound generator shifts;
FIG. 13 illustrates an exemplary sound generator position table;
FIG. 14 is a flowchart of exemplary processing operations of the audio AR device that relate to determination time adjustment processing.

DESCRIPTION OF EMBODIMENTS

Preferred embodiments will be explained with reference to accompanying drawings. The embodiments do not limit the disclosed technology.

[a] First Embodiment

Figure 1:
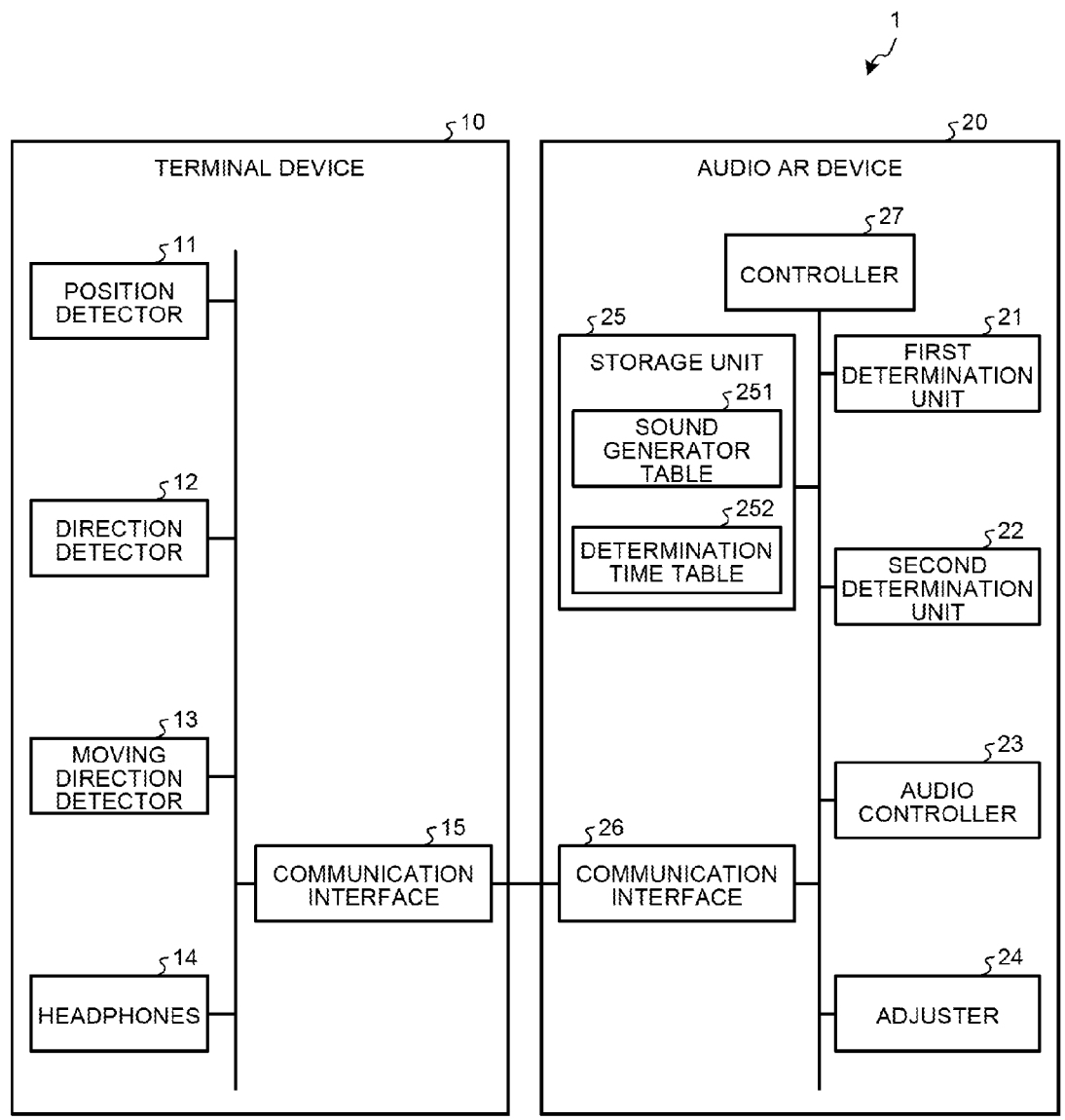
FIG. 1 is a block diagram of an exemplary audio AR system according to a first embodiment.

FIG. 1 is a block diagram of an exemplary audio augmented reality (AR) system according to a first embodiment. An audio AR system 1 illustrated in FIG. 1 includes a terminal device 10 and an audio AR device 20. The terminal device 10 is a client device, such as a head-mounted device, that is mounted on and carried by a user of the audio AR system 1. The audio AR device 20 is a server device, such as an acoustic device, that provides the user with guidance audio about an object around the user in a state where a sound generator corresponding to the object is localized in the position of the object.

The terminal device 10 illustrated in FIG. 1 includes a position detector 11, a direction detector 12, a moving direction detector 13, headphones 14, and a communication interface 15. The position detector 11, the direction detector 12, the moving direction detector 13, the headphones 14, and the communication interface 15 are connected with one another via, for example, a bus line.

The position detector 11 detects the current position of the terminal device 10. The position detector 11 detects the current position of the terminal device 10 by using the global positioning system (GPS). The position detector 11 may detect the current position of the terminal device 10 by, for example, using position information from a base station of a mobile phone network. The position detector 11 may detect the indoor current position of the terminal device 10 by three-point positioning using indoor access points. The current position of the terminal device 10 is the current position of the user who carries the terminal device 10. In other words, the position detector 11 detects the current position of the user who carries the terminal device 10.

The direction detector 12 detects the direction of the body of the user of the terminal device 10, e.g. the direction of the face of the user. The direction of the body of the user will be described as the direction of the face of the user here for the purpose of illustration but, alternatively, it may be, for example, the direction of the trunk of the user, the direction of the head of the user, or the direction of the line of sight of the user. When, for example, the direction of the line of sight of the user is detected, the direction of the line of sight is detected from a captured image of the eyes of the user. Furthermore, when detecting, for example, the direction of the trunk of the user, the direction detector 12 detects the direction of the trunk by using a gyro sensor (not illustrated).

The moving direction detector 13 detects the moving direction of the user who carries the terminal device 10 by using, for example, a geomagnetic field sensor, gyro sensor, or acceleration sensor (not illustrated). In other words, the terminal device 10 acquires, as the state of the user, the state that can be detected by the sensors (not illustrated), i.e., by the position detector 11, the direction detector 12, and the moving direction detector 13. As state of the user, a move of a hand may be acquired to detect a gesture or audio may be acquired to detect an audio command.

The headphones 14 serve as, for example, an acoustic output unit that outputs acoustic signals that are received from the audio AR device 20. Instead of the headphones 14, for example, earphones may serve as the acoustic output unit.

The communication interface 15 is an interface that implements communications with the audio AR device 20 by, for example, wireless communications. The communication interface 15 transmits various signals to the audio AR device 20 and receives various signals from the audio AR device 20. The communication interface 15 employs wireless communications. Alternatively, for example, wired communications may be employed. The communication interface 15 may communicate with the audio AR device 20 via various networks, such as a public network, the Internet, or a local area network (LAN).

The audio AR device 20 illustrated in FIG. 1 includes a first determination unit 21, a second determination unit 22, an audio controller 23, an adjuster 24, a storage unit 25, a communication interface 26, and a controller 27. The first determination unit 21, the second determination unit 22, the audio controller 23, the adjuster 24, the storage unit 25, the communication interface 26, and the controller 27 are connected with one another via, for example, a bus line.

Based on an angle θ that is formed by the moving direction of the user and the direction of the user's face, the first determination unit 21 determines an arbitrary object from among objects around a user as an object that is watched by the user. When a determination time elapses from the timing at which the object is determined as a watched object, the second determination unit 22 determines the watched object as a target of audio AR. When the watched object is determined as a target, the audio controller 23 generates acoustic signals for outputting guidance audio of the sound generator corresponding to the target from the position of the target. When the first determination unit 21 determines, as an object that is watched by the user, an object positioned in a direction other than the moving direction, the adjuster 24 subtracts, from the determination time and per predetermined cycle, a correction time corresponding to the angle that is formed by the moving direction of the user and the direction of the face. The communication interface 26 is an interface that implements communications with the terminal device 10. The communication interface 26 receives various signals, such as detection signals from the terminal device 10, and transmits various signals, such as acoustic signals, to the terminal device 10. The controller 27 controls whole the audio AR device 20.

The storage unit 25 stores various types of information, such as a sound generator table 251 and a determination time table 252. FIG. 4 illustrates the exemplary sound generator table 251. The sound generator table 251 manages sound generator files, etc. relating to guidance audio for the object in association with objects around the user. The sound generator table 251 stores object IDs 251A, object positions 251B, determination times 251C, and sound generator files 251D in association with one another. Each entry in the sound generator table 251 is set in advance in each existing object. The content of entry can be changed as appropriate. An object ID 251A represents an ID that identifies the object. An object position 251B represents the current position of the object, e.g., the position coordinates (Xm1,Ym1) in a coordinate system originating from a predetermined position. A determination time 251C represents an initial determination time, which is a default, until when the watched object is determined as a target. A sound generator file 251D includes a normal-state sound generator file 251E, a mid-determination sound generator file 251F, and a post-determination sound generator file 251G. A normal-state sound generator file 251E is an audio file of guidance audio that is output when the first determination unit 21 determines an object as a watched object. A mid-determination sound generator file 251F is an audio file of guidance audio that is output during determination from the timing at which an object is determined as a watched object until right before the determination time elapses. A post-determination sound generator file 251G is an audio file of guidance audio that is output when the watched object is determined as a target after the determination time elapses.

The audio controller 23 refers to the sound generator table 251. For example, when an object of "ID1" has not been determined as a watched object, the audio controller 23 reads "THIS IS AN AIR CONDITIONER" as a normal-state sound generator file 251E. The audio controller 23 then virtually localizes the sound generator in the position of the watched object and generates acoustic signals for outputting "THIS IS AN AIR CONDITIONER" from the position of the objet. When it is during determination from the timing at which the object is determined as a watched object until when the determination time elapses, the audio controller 23 reads, for example, "WILL YOU ADJUST ROOM TEMPERATURE?" as a mid-determination sound generator file 251F. The audio controller 23 then virtually localizes the sound generator in the position of the watched object and generates acoustic signals for outputting "WILL YOU ADJUST ROOM TEMPERATURE?" from the position of the objet. When the watched objet is determined as a target, the audio controller 23 reads, for example, "OPERATE REMOTE CONTROLLER" as a post-determination sound generator file 251G. The audio controller 23 then virtually localizes the sound generator in the position of the target and generates acoustic signals for outputting "OPERATE REMOTE CONTROLLER" from the position of the target.

The audio controller 23 refers to the sound generator table 251. For example, when the object of "ID2" is not determined as an object that is watched, the audio controller 23 reads "THIS IS A LUMINAIRE" as a normal-state sound generator file 251E. The audio controller 23 then virtually localizes the sound generator in the position of the watched object and generates acoustic signals for outputting "THIS IS A LUMINAIRE" from the position of the objet. When it is during the determination from the timing at which the object is determined as a watched object until when the determination time elapses, the audio controller 23 reads "WILL YOU TURN ON THE LUMINAIRE?" as a mid-determination sound generator file 251F. The audio controller 23 then virtually localizes the sound generator in the position of the watched object and generates acoustic signals for outputting "WILL YOU TURN ON THE LUMINAIRE" from the position of the objet. When the watched objet is determined as a target, the audio controller 23 reads, for example, "TURN ON THE SWITCH ON THE WALL" as a post-determination sound generator file 251G. The audio controller 23 then virtually localizes the sound generator in the position of the target and generates acoustic signals for outputting "TURN ON THE SWITCH ON THE WALL" from the position of the target.

The audio controller 23 transmits the generated acoustic signals to the terminal device 10 via the communication interface 26. The terminal device 10 outputs the received acoustic signals from the headphones 14. Accordingly, the user can hear guidance audio about the objet at various timings, i.e., when determining an object that is watched, during determining a target, and when determining a target.

Figure 2:
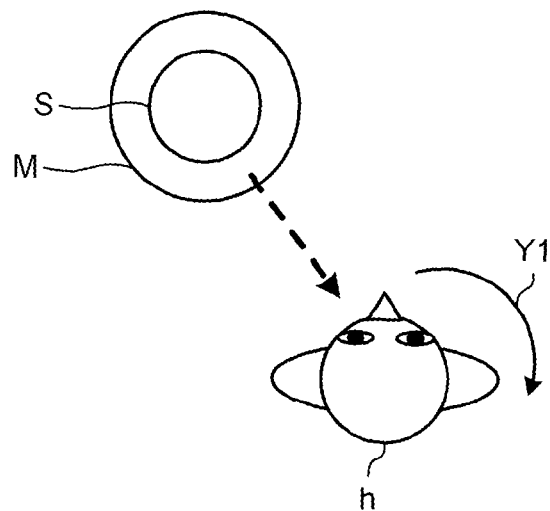
FIG. 2 illustrates exemplary audio AR implemented by an audio AR device.
Figure 3:
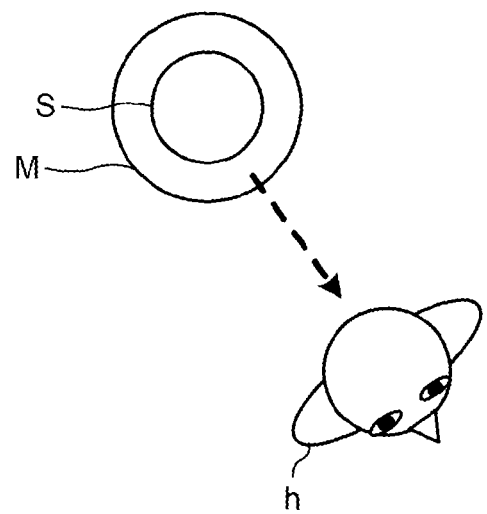
FIG. 3 illustrates exemplary audio AR implemented by the audio AR device.

FIGS. 2 and 3 illustrate exemplary audio AR implemented by the audio AR device 20. As illustrated in FIG. 2, based on an angle θ formed by the moving direction of a user h and the direction of the face of the user h, the audio controller 23 generates acoustic signals for outputting guidance audio about an object M in a front left position with respect to the user h such that a sound generator S of the object M is virtually oriented in the object M. The audio controller 23 transmits the acoustic signals to the terminal device 10. The terminal device 10 outputs the received acoustic signals from the headphones 14. Accordingly, the user h can hear the guidance audio, which sounds as if it is output from the object M in the front left position with respect to the user h. Associating the guidance audio with the position of the object M that is the target allows the user to know where a target is arranged and how to use the target.

A case will be assumed here where the user in the state of FIG. 2 turns to the direction denoted by the arrow Y1 and shifts to the state illustrated in FIG. 3. As illustrated in FIG. 3, based on the angle θ formed by the moving direction of the user and the direction of the face of the user, the audio controller 23 generates acoustic signals for outputting guidance audio about the objet M such that the sound generator S is virtually oriented in the object M that is in a back position with respect to the user h. The audio controller 23 transmits the acoustic signals to the terminal device 10. The terminal device 10 outputs the received acoustic signals from the headphones 14. Accordingly, the user h can hear the guidance audio, which sounds as if it is output from the object M in the back position with respect to the user h.

FIG. 5 illustrates the exemplary determination time table 252. The determination time table 252 illustrated in FIG. 5 stores entries in each of which an object ID 252A, an object position 252B, and a determination time 252C are associated together. An object ID 252A represents an ID that identifies an object. An object position 252B represents a set of coordinates of the position of an object. A determination time 252C represents a determination time that is updated, per frame time that starts at a predetermined cycle, by subtracting a correction time from the remaining time until when the determination time elapses. A frame time is a unit of transmission time for transmitting acoustic signals from the audio AR device 20 to the terminal device 10. The default value of the determination time 252C is an initial determination time that is set in advance for each watched object. When an object is determined as an object that is watched, a new entry is generated and added in the determination time table 252.

The following descriptions refer back to FIG. 1. Based on an angle formed by the moving direction of the user and the direction of the user's face, the first determination unit 21 determines whether "the user is looking aside". The first determination unit 21 acquires the position of the user h, the moving direction of the user h, and the direction of the face of the user h from the direction detector 12 and the moving direction detector 13. Based on the position of the user, the moving direction of the user, and the direction of the face of the user, the first determination unit 21 estimates the coordinates of the position of the watched object. The first determination unit 21 determines whether an object ID corresponding to the estimated position coordinates has been extracted from the sound generator table 251. When the object ID has been extracted, the first determination unit 21 determines the object corresponding to the extracted object ID as an object that is watched by the user.

Figure 6:
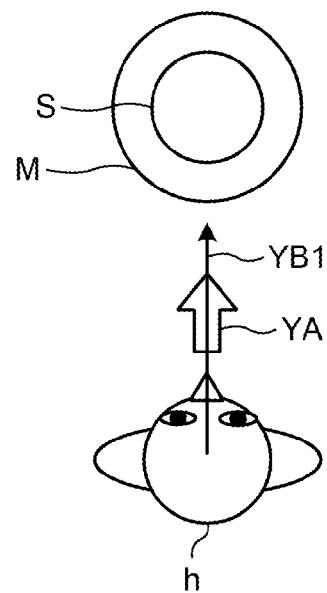
FIG. 6 illustrates a state where a user is watching an object that is present in the moving direction of the user.

FIG. 6 illustrates a state where the user is watching an object that is present in the moving direction. In the example of FIG. 6, the moving direction of the user h is the direction denoted by the arrow YA and the direction of the face of the user h is the direction denoted by the arrow YB1. The objet M is preset in the moving direction of the user h and the moving direction of the user h and the direction of the face of the user h coincide with each other. When the object ID of the object M that is present in the moving direction of the user h and the face direction of the user h that are coincide with each other can be extracted from the sound generator table 251, the first determination unit 21 determines the object M present in the moving direction as the object that is watched.

Figure 7:
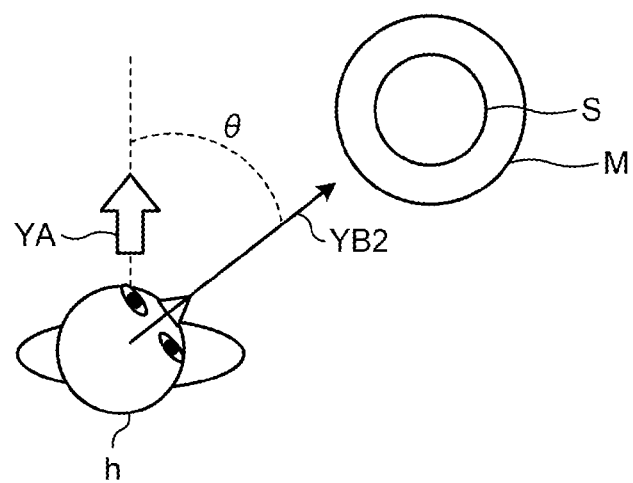
FIG. 7 illustrates a state where the user is watching an object that is present in a looking-aside direction.

FIG. 7 illustrates a state where the user is watching an object that is present in a looking-aside direction. The moving direction of the user h is denoted by the arrow YA and the direction of the face of the user h is denoted by the arrow YB2. The object M is present in a direction other than the moving direction of the user h and the moving direction of the user h is different from the direction of the face of the user h. When the object ID of the object M present in the looking-aside direction, i.e., in the direction of the face, can be extracted from the sound generator table 251, the first determination unit 21 determines the object M in the looking-aside direction as an object that is watched.

Figure 8:
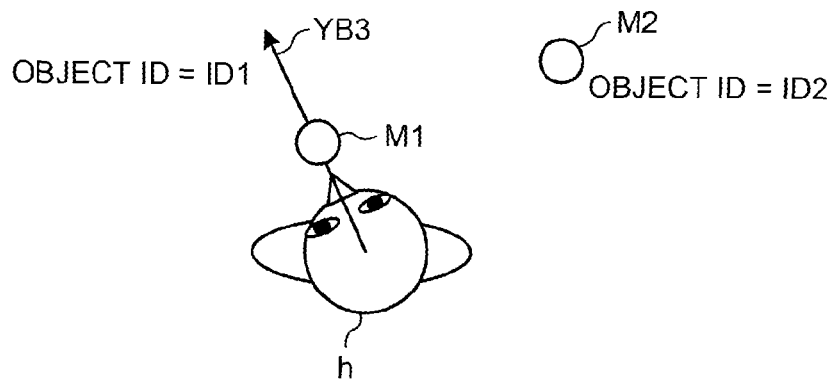
FIG. 8 illustrates exemplary operations for adding a new entry in a determination time table.
Figure 9:
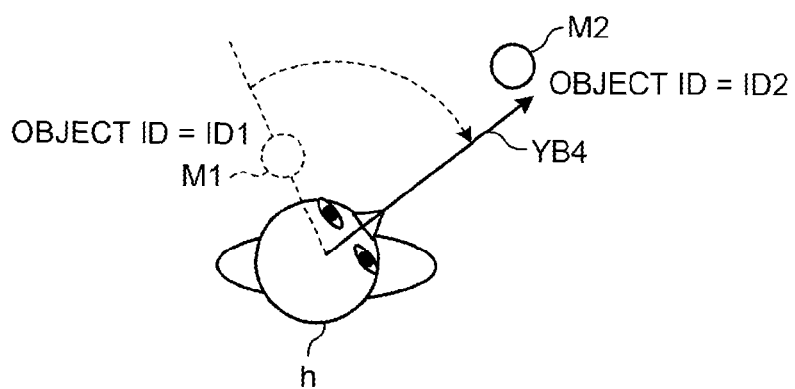
FIG. 9 illustrates exemplary operations for adding a new entry in the determination time table.

FIGS. 8 and 9 illustrate exemplary operations that relate to adding of a new entry in the determination time table 252. The example of FIG. 8 illustrates a state where an object M1 is present in the direction denoted by the arrow YB3, i.e., the direction in which the user h watches. As illustrated in FIG. 8, the first determination unit 21 determines the object M1 near the user as an object that is watched. When the object M1 is determined as a watched object, the adjuster 24 reads the object ID, object position, and determination time corresponding to the object M1 from the sound generator table 251. The adjuster 24 then adds a new entry of the object M1 to the determination time table 252 and stores the read object ID, objet position, and determination time in the new entry. For example, the adjuster 24 stores, in the determination time table 252, "ID1" in an object ID 252A, (Xm1,Ym1) in an object position 252B, and "10 SECONDS" in a determination time 252C. There is also an object M2 around the user h. However, because the first determination unit 21 does not determine the objet M2 as a watched object, the first determination unit 21 does not store data on the object M2 in the determination time table 252.

As illustrated in FIG. 9, when the direction in which the user h watches is changed to the direction denoted by the arrow YB4, i.e., the direction of the object M2, the first determination unit 21 determines the object M2 as an object that is watched. When the object M2 is determined as a watched object, the adjuster 24 reads the object ID, object position, and determination time corresponding to the object M2 from the sound generator table 251. The adjuster 24 adds a new entry of the object M2 to the determination time table 252 and stores the read object ID, object position, and determination time in the new entry. The adjuster 24 stores, for example, "ID2" in an object ID 252A, (Xm2,Ym2) in an object position 252B, and "20 SECONDS" in a determination time 252C in the determination time table 252. When the user h turns from the direction denoted by the arrow YB3 to the direction denoted by the arrow YB4 as indicated by the dotted arrow illustrated in FIG. 9, the first determination unit 21 determines that the object M1 is not a watched object anymore. Accordingly, the adjuster 24 deletes the entry of the object M1 from the determination time table 252.

When the determination time is 0 seconds or less, i.e., when the determination time has elapsed, the second determination unit 22 determines the watched object as a target of audio AR. In other words, when the determination time elapses from the timing at which the first determination unit 21 determines the object as an object that is watched, the second determination unit 22 determines the watched object as the target. The target is an object for which stereophonic acoustic guidance audio, i.e., audio AR, is requested to be implemented from among objects to be watched.

Based on a difference between the moving direction of the user and the direction of the user's face, e.g., the angle formed by the moving direction of the user and the direction of the user's face, the adjuster 24 makes adjustment to reduce the remaining time until when the determination time elapses. When there is not any entry of the watched object, the adjuster 24 adds a new entry of the object. When there is the entry of the watched object, the adjuster 24 reads the determination time from the entry. In each time a frame time in the determination time elapses, the adjuster 24 subtracts, from the determination time, the correction time that varies according to the angle θ formed by the moving direction and the direction of the user's face. The adjuster 24 regards the determination time resulting from the subtraction as a new determination time and updates the entry corresponding to the watched object. The correction time is a time obtained by adding, to a normal elapsed time, a correction amount that varies depending on the angle formed by the moving direction of the user and the direction of the user's face. The correction amount is 0 when the angle θ is 0. For example, the correction amount increases as the angle θ gets close to 180 degrees in an angle range of 0<θ≤180 degrees. The normal elapsed time equals to the time of frame times reached.

For example, when the angle θ formed by the moving direction of the user and the direction of the face of the user is 0 degrees, the correction amount is 0 and accordingly the correction time equals to only the normal elapsed time. Each time a frame time elapses, the adjuster 24 calculates a remaining time by subtracting the normal elapsed time, which is the correction time, from the determination time, regards the remaining time as a new determination time, and updates the corresponding entry in the determination time table 252. In contrast, when the angle θ formed by the moving direction of the user and the direction of the face of the user is not 0 degrees, the correction amount increases in accordance with the angle θ and accordingly the correction time equals to (the normal elapsed time+correction amount). Accordingly, each time a frame time elapses, the adjuster 24 calculates the remaining time by subtracting the correction time, i.e., (the normal elapsed time+correction amount), from the determination time, regards the calculated remaining time as a new determination time, and updates the corresponding entry in the determination time table 252. Accordingly, the audio AR device 20 increases the correction amount as the angle θ increases and, in accordance with the increase in the correction amount, the determination time becomes shorter than usual.

The method of adjusting the determination time, which is performed by the adjuster 24, will be described more specifically here. First, it will be described how to adjust the determination time for a watched object that is present in the moving direction of the user. When an object that is present in the moving direction is determined as a watched object, the adjuster 24 adds an entry corresponding to the watched object to the determination time table 252. The adjuster 24 sets, in the determination time 252C in the corresponding entry of the determination time table 252, an initial determination time t0 corresponding to the object ID of the watched object in the sound generator table 251. A time longer than the frame time is set for the initial determination time t0. For example, a time is set in which the watched object can be determined as a target when the determination time is updated for a plurality of times. When the initial determination time is t0, the determination time is "t0" at the timing when the first frame time pf tf=0 starts.

At the timing when the next frame time of tf=1 starts, the adjuster 24 subtracts the normal elapsed time of (1*tf) corresponding to one frame time from the initial determination time t0. The remaining time of the determination time is represented by "t0−1*tf". The adjuster 24 regards the remaining time as the next determination time t1 (=t0−1*tf) and updates the corresponding entry in the determination time table 252. For example, when the initial determination time t0 is "10 seconds" and the frame time tf is "2 seconds", the adjuster 24 regards, as the current determination time t1, "8 seconds" obtained by subtracting "2 seconds" of the normal elapsed time of from "10 seconds" of the initial determination time t0 and updates the corresponding entry.

At the timing when the next frame time of tf=2 starts, the adjuster 24 subtracts the normal elapsed time of (1*tf) corresponding to one frame time from the previously-updated determination time t1. The remaining time of the determination time is represented by "t0−2*tf". The adjuster 24 regards the remaining time as the next determination time t2 (=t0−2*tf) and updates the corresponding entry. For example, the adjuster 24 regards, as the current determination time t2, "6 seconds" obtained by subtracting "2 seconds" of the frame time tf from "8 seconds" of the previously-updated determination time t1 and updates the corresponding entry.

At the timing when the next frame time tf=3 starts, the adjuster 24 subtracts the normal elapsed time of (1*tf) of one frame time from the previously-updated determination time t2. The remaining time of the determination time is represented by "t0−3*tf". The adjuster 24 regards the remaining time as the next determination time t3 (=t0−3*tf) and updates the corresponding entry. For example, the adjuster 24 regards, as the current determination time t3, "4 seconds" obtained by subtracting "2 seconds" of the frame time tf from "6 seconds" of the previously-updated determination time t2 and updates the corresponding entry. Subsequently, the adjuster 24 similarly subtracts the normal elapsed time per each frame time and updates the determination time. Because the determination time is 0 second at the timing when the frame time tf=5 starts, the second determination unit 22 determines the watched object that is present in the moving direction as a target.

The method of adjusting the determination time for a watched object that is present in a direction in which the user is looking aside will be described here. The first determination unit 21 determines, as a watched object, an object that is present in a looking-aside direction when there is an angle $\theta$ formed by the moving direction of the user and the direction of the user's face. When the object that is present in the looking-aside direction is determined as a watched object, the adjuster 24 adds an entry corresponding to the watched object to the determination time table 252. The adjuster 24 sets, in the determination time 252C in the corresponding entry of the determination time table 252, an initial determination time t0 corresponding to the object ID of the watched object in the sound generator table 251. When the initial determination time is t0, the determination time is "t0" at a timing when the first frame time of tf=0 starts.

At the timing when the next frame time tf=1 starts, the adjuster 24 subtracts, from the initial determination time t0, a correction time obtained by summing the normal elapsed time (1*tf) of one frame time and a correction amount (a*$\theta$1) based on an angle $\theta$1. The remaining time of the determination time is represented by "t0−a*$\theta$1−1*tf". The adjuster 24 regards the remaining time as the next determination time t1 (=t0−a*$\theta$1−1*tf) and updates the corresponding entry in the determination time table 252, where "a" of the correction amount is a constant and an appropriate value is set for "a" such that the determination time gradually decreases. For example, "10 seconds" is set for the initial determination time t0, "2 seconds" is set for the frame time tf, and "1 second" is set for the correction time (a*$\theta$1). In this case, the adjuster 24 regards "7 seconds" obtained by subtracting, from "10 seconds", "1 second" of the correction time in addition to "2 seconds" of the normal elapsed time and updates the corresponding entry.

At the timing when the next frame time tf=2 starts, the adjuster 24 subtracts, from the previously-updated determination time t1, a correction time obtained by summing the normal elapsed time (1*tf) of one frame time and a current correction amount (a*$\theta$2). The remaining time of the determination time is represented by "t0−a*$\theta$1−a*$\theta$2−2*tf". The adjuster 24 regards the remaining time as the next determination time t2 (=t0−a*$\theta$1−a*$\theta$2−2*tf) and updates the corresponding entry. For example, when the correction time "a*$\theta$2" is "1 second", the adjuster 24 regards, as the current determination time t2, "4 seconds" obtained by subtracting, from "7 seconds" of the previously-updated determination time t1, "2 seconds" of the normal elapsed time in addition to "1 second" of the correction amount (a*$\theta$2) and updates the corresponding entry.

At the timing when the next frame time tf=3 starts, the adjuster 24 subtracts, from the previously-updated determination time t2, a correction time obtained by summing the normal elapsed time (1*tf) of one frame time and a current correction amount (a*$\theta$3). The remaining time of the determination time is represented by "t0−a*$\theta$1−a*$\theta$2−a*$\theta$3−3*tf". The adjuster 24 regards the remaining time as the next determination time t3 (=t0−a*$\theta$1−a*$\theta$2−a*$\theta$3−3*tf) and updates the corresponding entry. For example, when the correction time (a*$\theta$3) is "1 second", the adjuster 24 regards, as the current determination time t3, "1 second" obtained by subtracting, from "4 seconds" of the previously-updated determination time t2, "2 seconds" of the normal elapsed time in addition to "1 second" of the correction amount (a*$\theta$3) and updates the corresponding entry.

Subsequently, per frame time, the adjuster 24 similarly subtracts a correction time obtained by subtracting a correction time obtained by summing the normal elapsed time and a correction amount based on the angle $\theta$ and updates the determination time. At the timing when the next frame time tf=4 starts, the determination time is 0 seconds and accordingly the watched object in the looking-aside direction can be determined as a target. Accordingly, when the angle $\theta$ formed by the moving direction of the user and the direction of the face of the user is larger than 0 degrees, the adjuster 24 subtracts, per frame time, a correction time obtained by adding a correction amount corresponding to the angle $\theta$ from the determination time. The determination time until a watched object present in a looking-aside direction is determined as a target is made shorter than that in a case where there is a watched object in the moving direction, i.e., where the angle is 0 degrees.

When the second determination unit 22 determines that the watched object is a target, the audio controller 23 reads the post-determination sound generator file 251G corresponding to the object ID of the target from the sound generator table 251. The audio controller 23 generates acoustic signals for outputting, from the headphones 14 of the user, guidance audio of the read sound generator file 251G in a state where the sound generator is virtually oriented in the position of the object of the target. For example, the audio controller 23 virtually localizes the sound generator in the position of the target by, for example, inputting the acoustic signals of the right channel and the left channel to delay circuits, respectively, and delays the signals with different delay times. The audio controller 23 may virtually orient the sound generator in the position of the target by, for example, passing the audio signals of the right channel and the left channel through filters that are given with a phase difference and amplitude difference between the ears of the user. The audio controller 23 is, for example, a generator.

Figure 10:
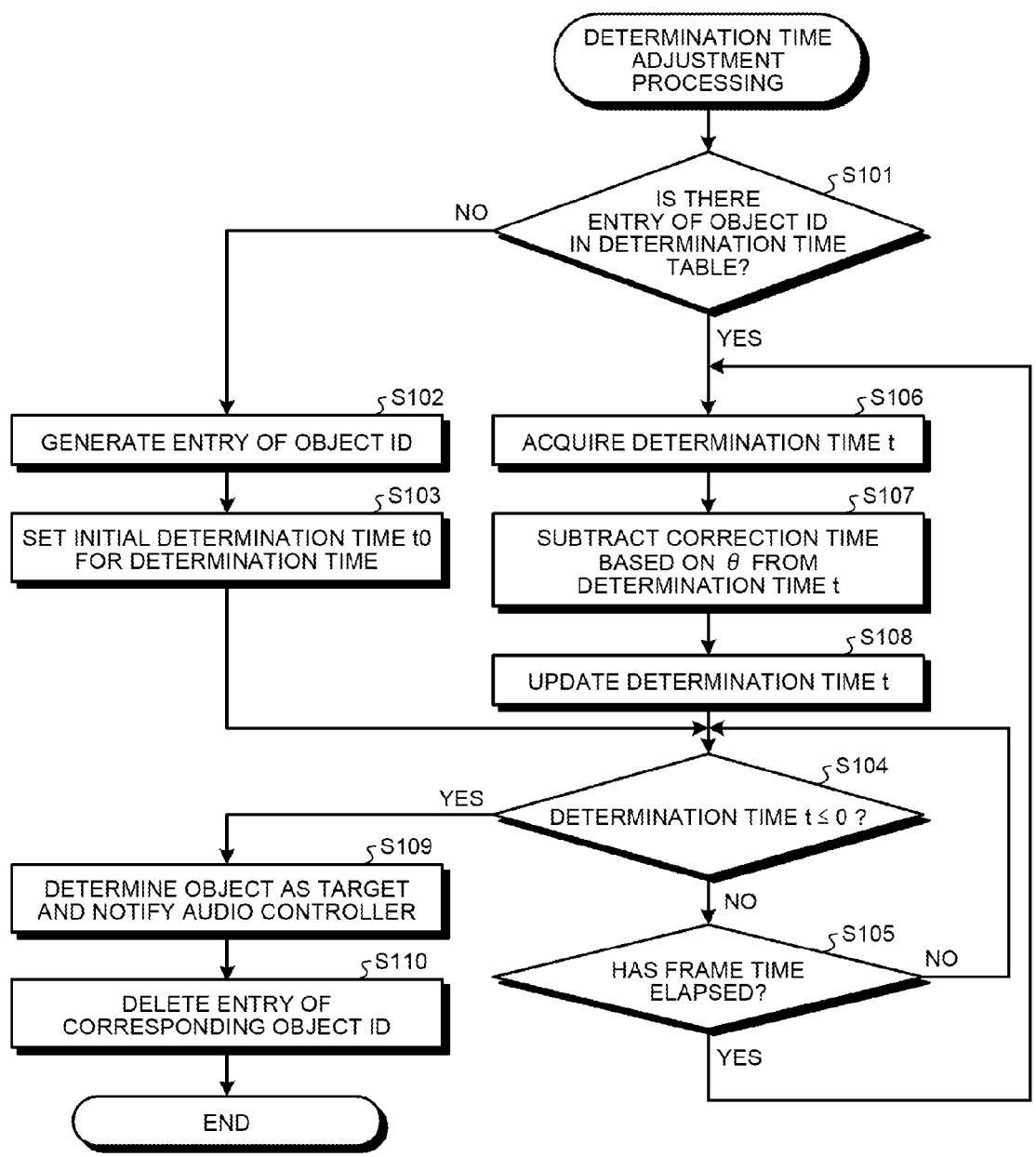
FIG. 10 is a flowchart of exemplary processing operations of an audio AR device that relate to determination time adjustment processing.

Operations of the audio AR system 1 of the first embodiment will be described here. FIG. 10 is a flowchart of exemplary processing operations of the audio AR device 20 that relate to the determination time adjustment processing. The determination time adjustment processing illustrated in FIG. 10 is processing for, when an object is determined as an object that is watched, making an adjustment to reduce the determination time per frame time by using a correction time.

As illustrated in FIG. 10, when the first determination unit 21 determines an object as an object that is watched, the adjuster 24 of the audio AR device 20 determines whether the entry of the object ID corresponding to the position of the object that is present in the watching direction is in the determination time table 252 (step S101). When the entry of the object ID is not in the determination time table 252 (NO at step S101), the adjuster 24 adds a new entry of the object ID to the determination time table 252 (step S102). The adjuster 24 sets an initial determination time t0 in a determination time 252C of the entry of the object ID (step S103). The adjuster 24 reads the initial determination time t0 and the position coordinates of an object position 251B that correspond to an object ID 251A from the sound generator table 251 and registers them in the corresponding entry in the determination time table 252.

The second determination unit 22 of the audio AR device 20 determines whether the determination time corresponding to the object ID in the determination time table 252 is 0 seconds or less (step S104). When the determination time is not 0 seconds or less (NO at step S104), the adjuster 24 determines whether the elapsing frame time in the determination time has elapsed (step S105). When the frame time has not elapsed (NO at step S105), the adjuster 24 moves to step S104 in order to determine whether the determination time is 0 seconds or less.

When the frame time has elapsed (YES at step S105), the adjuster 24 reads a determination time t from the entry corresponding to an object ID 252A of the watched object (step S106). The adjuster 24 then subtracts a correction time based on an angle θ from the read determination time (step S107). The correction time is obtained by summing a normal elapsed time corresponding to the number of times the frame time elapses and a correction amount based on the angle θ. The angle θ is the angle formed by the moving direction of the user and the direction of the face of the user with respect to the watched object at a time when the determination time is read at step S106.

The adjuster 24 calculates the remaining time by subtracting the correction time from the determination time that is read at step S106, regards the remaining time as a new determination time, and updates the determination time 252C in the corresponding entry (step S108). The adjuster 24 moves to step S105 in order to determine whether the determination time is 0 seconds or less.

When the determination time is 0 seconds or less (YES at step S104), i.e., upon determining that the determination time has elapsed, the second determination unit 22 determines the watched objet as a target (step S109). Upon determining the watched objet as a target, the second determination unit 22 notifies the audio controller 23 of an audio AR request regarding the object ID of the target. The audio controller 23 refers to the sound generator table 251, generates acoustic signals based on the object position 251B and the post-determination sound generator file 251D corresponding to the object ID of the target, and transmits the generated acoustic signals to the terminal device 10. The terminal device 10 outputs the received acoustic signals from the headphones 14. Accordingly, the user of the terminal device 10 can hear the guidance audio for the target from the headphones 14 in a state where the sound generator is oriented in the position of the target. When the watched object is determined as a target, the adjuster 24 deletes the entry corresponding to the object ID 252A of the target from the determination time table 252 (step S110) and ends the processing operations illustrated in FIG. 10.

In the determination time adjustment processing illustrated in FIG. 10, the audio AR device 20 calculates, per frame time, a correction time including the normal time and a correction amount based on the angle θ, subtracts the correction time from the determination time, and updates the determination time after the subtraction. When the updated determination time has elapsed, the audio AR device 20 determines the watched object as a target. As a result, the user can determine the watched object as a target.

When a watched object is present in the moving direction, the angle θ is 0 degrees and accordingly the correction amount to be added to the correction time is 0. In contrast, when a watched object is present in a looking-aside direction, the angle θ increases and accordingly the correction amount to be added also increases, which increases the correction time. In other words, the correction time in a case where the watching direction is in a looking-aside direction increases compared to a case where the watched object is in the moving direction and accordingly the determination time shortens, which makes it possible to quickly determine the watched object as a target.

Upon detecting a state where "the user is looking aside" from the difference between the moving direction of the user and the direction of the face of the user, the audio AR device 20 of the first embodiment makes an adjustment such that the determination time until when the watched object is determined as a target is reduced compared to a case where the object is present in the moving direction. Accordingly, a target for which implementation of audio AR is requested can be determined quickly. Furthermore, the state where the user is not looking ahead carefully can be shortened, which increases the usability to the user.

Each time a frame time elapses, the audio AR device 20 makes an adjustment to reduce the remaining time until when the determination time elapses, regards the adjusted remaining time as a new determination time, and updates the determination time and, when the new determination time has elapsed, the audio AR device 20 determines the watched object as a target. Accordingly, the determination time until the watched object is determined as a target can be shorter than the normal elapsed time, which makes it possible to quickly determine a target for which implementation of audio AR is requested.

When an object present in a looking-aside direction is determined as a watched object, the audio AR device 20 shortens the determination time in accordance with the angle θ formed by the moving direction of the user and the direction of the face of the user. When the state where "the user is looking aside" is detected, the determination time until when the watched object is determined as a target is made shorter than the normal elapsed time and the determination time is shortened as the angle θ increases. Accordingly, a target for which implementation of audio AR is requested can be determined quickly.

In the audio AR system 1 of the first embodiment, the audio AR device 20 has various functions of the first determination unit 21, the second determination unit 22, the audio controller 23, the adjuster 24, and the storage unit 25. Alternatively, for example, the terminal device 10 may have such various functions. In such a case, the load of the audio AR device 20 can be reduced, which increases the processing speed.

In the audio AR system 1, the audio AR device 20 includes the storage unit 25 and the audio controller 23. Alternatively, an external device may be provided with the storage unit 25 and the audio controller 23 and may be connected to the audio AR device 20 via a network. In this case, the load of the audio AR device 20 can be reduced, which increases the processing speed.

Different devices may include the first determination unit 21, the second determination unit 22, the audio controller 23, the adjuster 24, the storage unit 25, the controller 27, and a setting unit 28, respectively, and they may be connected to one another in the network and cooperate in order to implement the functions of the audio AR device 20. This distributes the load of the audio AR device 20 to each device.

The audio AR device 20 of the first embodiment is configured to determine the watched object as a target according to the elapse of the determination time without notifying the user of how much the determination time has elapsed. Alternatively, a user may be notified of how much the determination time has elapsed. Such an embodiment will be described below as a second embodiment.

[b] Second Embodiment

Figure 11:
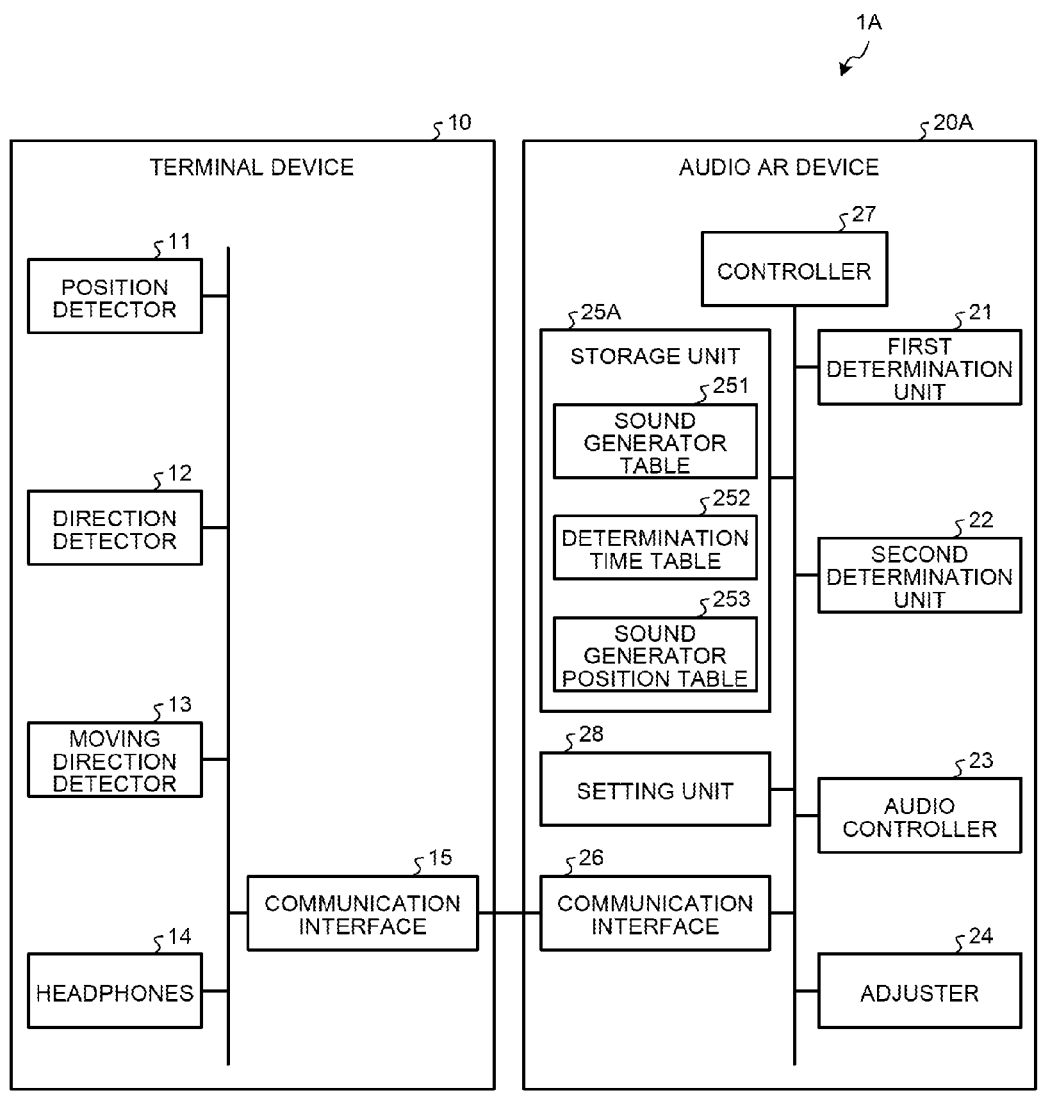
FIG. 11 is a block diagram of an exemplary audio AR system according to a second embodiment.

FIG. 11 is a block diagram of an exemplary audio AR system according to the second embodiment. By denoting the same components as those of the audio AR system 1 illustrated in FIG. 1 with the same reference numerals as those illustrated in FIG. 1, the same descriptions on the same configuration and operations will be omitted below. As illustrated in FIG. 11, an audio AR system 1A is different from the audio AR system 1 illustrated in FIG. 1 in that the setting unit 28 is provided in an audio AR device 20A and a sound generator position table 253 is provided in a storage unit 25A.

The setting unit 28 sets the coordinates of the position in which a sound generator corresponding to an object that is watched by a user is virtually oriented. The coordinates of the position of the sound generator coincide with the coordinates of the actual position of an object when an initial determination time for the first frame time is set. The setting unit 28 changes the coordinates of the position of the sound generator each time when a frame time has elapsed and sequentially updates the coordinates of the position of the sound generator such that the sound generator gradually gets close to the user. The sound generator position table 253 is a table for managing the coordinates of virtual positions of the sound generator. The setting unit 28 update, per frame time, the coordinates of the position of the sound generator in the sound generator position table 253 such that the sound generator gets close to the user until the timing when the determination time in the corresponding entry of the determination time table 252 is 0 seconds or less.

FIG. 12 illustrates exemplary operations performed when the position of a sound generator shifts. As illustrated in FIG. 12, the setting unit 28 changes, per time frame, the coordinates of the position of the sound generator in the direction denoted by the arrow Y2 such that the position of the sound generator gradually gets close to the user h. At the time when the first frame time starts, there is a sound generator S1 in the actual position of an object M1 and the setting unit 28 changes the position coordinates for each time when a frame time has elapsed in the following order: the sound generator S2, the sound generator S3, and the sound generator S4. The setting unit 28 changes the coordinates of the position of the sound generator such that the sound generator is oriented in front of the face of the user at the time when the determination time is 0 seconds or less. Accordingly, when the watching direction is in the moving direction of the user, the setting unit 28 changes the coordinates of the position of the sound generator for N times (N=(determination time t0)/(frame time tf)). In contrast, when the watching direction is not in the moving direction of the user, the setting unit 28 changes the coordinates of the position of the sound generator for N' times (N'<t0/tf).

FIG. 13 illustrates the exemplary sound generator position table 253. The sound generator position table 253 illustrated in FIG. 13 stores an object ID 253A and a sound generator position 253B in association with each other. An object ID 253A represents an ID that identifies the object. A sound generator position 253B represents the coordinates of the position of the sound generator updated by the setting unit 28. The setting unit 28 enters, per time frame, the coordinates of the position of the sound generator in a sound generator position 253B in the sound generator position table 253 in order to update the position coordinates.

When changing the position coordinates (Xs,Ys) of the sound generator to the position coordinates (Xh,Yh) of the user h after the determination time t elapses, the setting unit 28 shifts the position of the sound generator at a velocity of D/t that is obtained by dividing the distance D between the sound generator S1 and the user h by the determination time t. The setting unit 28 shifts, per frame time, the position of the sound generator by a distance of d=(D/t)*tf.

FIG. 14 is a flowchart of exemplary processing operations of the setting unit 28 regarding the sound generator position calculating processing. The sound generator position calculating processing illustrated in FIG. 14 is processing for changing, per frame time, the coordinates of the position of the sound generator such that the sound generator gets close to the user h.

As illustrated in FIG. 14, the setting unit 28 determines whether a frame time has elapsed (step S201). When the frame time has not elapsed (NO at step S201), the setting unit 28 moves to step S201 in order to monitor whether the frame time has elapsed. When the frame time has elapsed (YES at step S201), the setting unit 28 acquires the coordinates (Xs, Ys) of the position of the sound generator, the coordinates (Xh,Yh) of the position of the user, the determination time t, and the frame time tf (step S202). The setting unit 28 then calculates a new position of the coordinates, i.e., the coordinates (Xs',Ys') of the position after a frame time tf, according to the following Equation (1) (step S203):

$$Xs'=Xs-(Xs-Xh)*(tf/t)$$
$$Ys'=Ys-(Ys-Yh)*(tf/t) \quad (1)$$

The setting unit 28 updates the position of the sound generator by entering the sound generator position coordinates resulting from the calculation according to Equation (1) in the sound generator position table 253 (step S204). The audio controller 23 generates acoustic signals for outputting guidance audio of the mid-determination sound generator file 251F from the updated sound generator position. The setting unit 28 then determines whether the sound generator position coordinates are the coordinates of a position in front of the face of the user (step S205). When the sound generator position coordinates are not the coordinates of a position in front of the face of the user (NO at step S205), the setting unit 28 moves to step S201 in order to monitor whether the frame time has elapsed. When the sound generator position coordinates are the coordinates of a position in front of the face of the user (YES at step S205), the setting unit 28 ends the processing operations illustrated in FIG. 14.

In the sound generator position calculating processing illustrated in FIG. 14, the setting unit 28 can update the coordinates of the position of the sound generator per frame time, which provides the user with guidance audio of a mid-determination sound generator file such that the sound generator gradually gets close to the user per frame time. Accordingly, the user can recognize how much the determination time until when the object is determined as a target for which implementation of audio AR is requested has elapsed.

The audio AR device 20A of the second embodiment changes the coordinates of the position of the sound generator per frame time and provides the user with the guidance audio such that the sound generator of the watched object gradually gets close to the user. The audio AR device 20A changes the position of the sound generator such that the sound generator is eventually oriented in front of the face of the user. Accordingly, because the guidance audio gradually gets close to the user, the user can recognize how much the determination time has elapsed.

Furthermore, the audio AR device 20A notifies the user how much the determination time has elapsed by causing the sound generator of the watched object to get close to the user gradually. Accordingly, before the determination time elapses, the user can recognize the time during which audio AR can be cancelled.

In the first and second embodiments, a state where the user is looking aside is detected and an adjustment is made to reduce the determination time until when the watched object is determined as a target. Furthermore, for example, stopping during walking can be a more significant watching behavior. An embodiment in which the determination time for determining such a watching behavior is adjusted will be described below as a third embodiment.

[c] Third Embodiment

Figure 15:
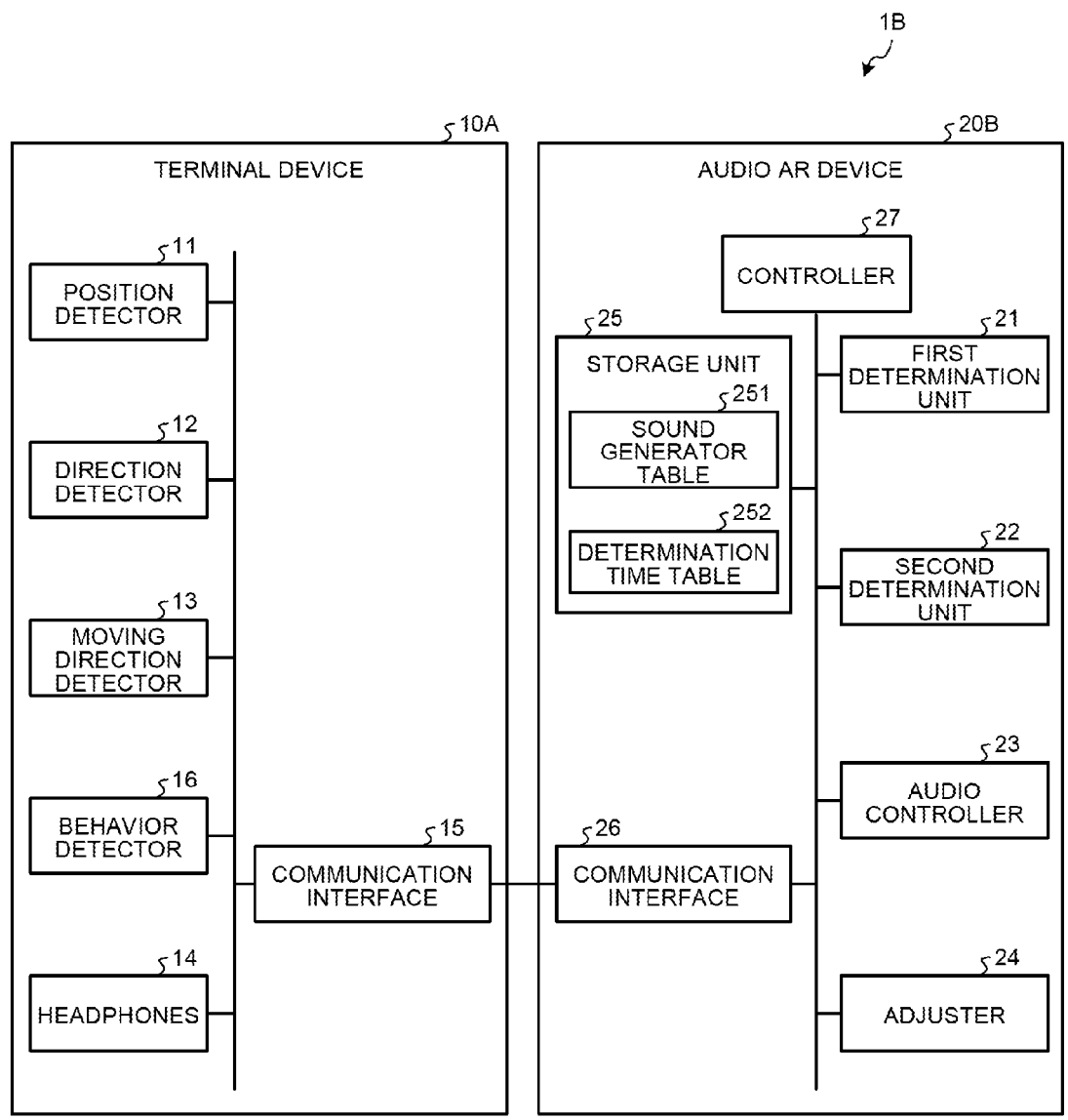
FIG. 15 is a block diagram of an exemplary audio AR system according to a third embodiment.

FIG. 15 is a block diagram of an exemplary audio AR system according to the third embodiment. By denoting the same components as those of the audio AR system 1 illustrated in FIG. 1 with the same reference numerals as those illustrated in FIG. 1, the same descriptions on the same configuration and operations will be omitted below. As illustrated in FIG. 15, an audio system 1B is different from the audio AR system 1 illustrated in FIG. 1 in that a terminal device 10A is provided to a behavior detector 16 and in that, when the behavior detector 16 detects a watching behavior to the watched object, an adjustment is made to reduce the determination time such that determination time goes faster.

The watching behavior is, for example, a behavior where the user stops while walking. The behavior is taken frequently when there is an attempt to confirm a watched object more in detail. In this case, based on, for example, variations in the number of steps of the user or the moving speed of the user, the behavior detector 16 detects a behavior of stopping while walking.

The watching behavior includes, for example, a behavior where the user gets his/her hand close to his/her ear. The behavior of getting his/her hand close to his/her ear can be regarded as a behavior of trying to hear the sound because the user is interested in an object that is watched. The method of implementing the behavior detector 16 that detects such a behavior can be taken in a way that a near field communication (NFC) tag is attached to the hand and an NFC reader is arranged in the vicinity of the vibration board of the headphones 14. The behavior detector 16 detects that the NFC reader reads the ID of the NFC tag as a user's behavior of getting his/her hand close to the ear.

Upon detecting the watching behavior, the behavior detector 16 notifies an audio AR device 20B of the detection via the communication interface 15. When the user's watching behavior is detected, the first determination unit 21 determines, as an object that is watched by the user, an object that is positioned in a direction other than the moving direction. When the object is determined as an object that is watched by the watching behavior, the adjuster 24 subtracts, from the determination time, a normal elapsed time and a correction amount based on the angle θ and furthermore a correction time is corresponding to the watching behavior.

Figure 16:
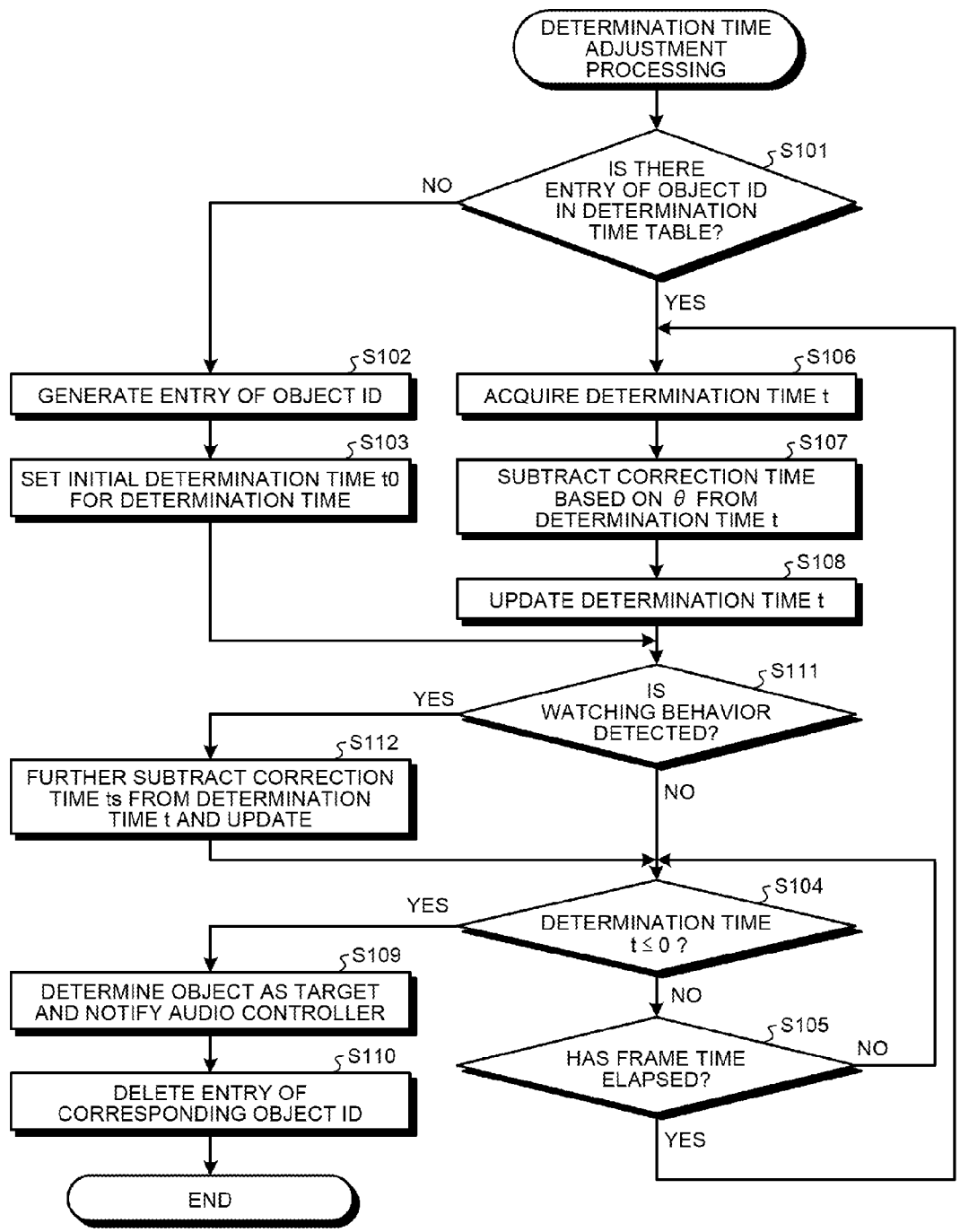
FIG. 16 is a flowchart of exemplary processing operations of the audio AR device that relate to determination time adjustment processing.

Operations of the audio AR device 20B of the third embodiment will be described here. FIG. 16 is a flowchart of exemplary processing operations of the audio AR device 20B that relate to determination time adjustment processing. The determination time update processing illustrated in FIG. 16 is processing, performed when a watching behavior of the user is detected, for further reducing the determination time by subtracting a correction time ts corresponding to the watching behavior from the determination time.

After calculating the remaining time by subtracting the correction time from the determination time t, regarding the remaining time as a new determination time, and updating the determination time 252C in the entry (step S108), the adjuster 24 determines whether a watching behavior of the user is detected (step S111). When the watching behavior of the user is detected (YES at step S111), the adjuster 24 further subtracts a correction time ts corresponding to the watching behavior from a determination time t in the determination time 252C of the corresponding entry of the determination time table 252. The adjuster 24 then updates the determination time 252C of the same entry with the determination time resulting from the subtraction (step S112). In other words, when a watching behavior is detected, the adjuster 24 subtracts, from the determination time, a correction time obtained by summing a normal elapsed time corresponding to the number of times a frame time has elapsed and a correction amount based on the angle θ and a correction time ts corresponding to the watching behavior.

After updating the determination time t at step S112, the adjuster 24 moves to step S104 in order to monitor whether the determination time t is 0 seconds or less. When the adjuster 24 does not detect any watching behavior of the user (NO at step S111), the adjuster 24 moves to step S104.

In the determination time update processing illustrated in FIG. 16, when a watching behavior is detected, the adjuster 24 adds a correction time ts corresponding to the watching behavior so that the correction time increases, which increases the amount that is subtracted from the determination time and thus shortens the determination time. Accordingly, a target for which implementation of audio AR is requested can be determined quickly.

When a watching behavior of the user is detected, the audio AR device 20B of the third embodiment adds a correction time ts corresponding to the watching behavior in addition to the correction time including the correction amount corresponding to the angle θ formed by the moving direction and the direction of the user's face, which increases the correction time that is subtracted from the determination time. An increase in the correction time increases the amount of subtraction from the determination time, which shortens the determination time. This makes it possible to quickly determine a target. Furthermore, because the state where the user is not looking ahead carefully can be shortened, which increases the usability to the user.

Furthermore, when the audio AR device 20B detects a user's behavior of stopping to confirm the object the user is watching as a watching behavior and subtracts a much longer correction time from the determination time, which shortens the determination time. Accordingly, a target for which implementation of audio AR is requested can be determined quickly.

Furthermore, the audio AR device 20B detects, as a watching behavior, a user's behavior of trying to hear the sound of the object that the user is watching and subtracts a much longer correction time from the determination time, which makes it possible to quickly determine a target for which implementation of audio AR is requested.

The audio AR device 20B of the third embodiment may include the setting unit 28 and the sound generator position table 253 illustrated in FIG. 11 and, according to the change in the position of the sound generator, notify the user of how much the determination time has elapsed from the timing at which the watched object is detected until when the determination time elapses. In this case, the user can know the time until when the object is determined as a target for which implementation of audio AR is requested, which increases the usability to the user.

The behavior detector 16 may detect a plurality of types of behavior, e.g. both of the behavior of stopping during walking and the behavior of getting a hand close to an ear. When the behavior detector 16 detects both of the behaviors, the adjuster 24 may increase a correction time more compared to a case where one type of behavior is detected.

Even when the user continues watching the same object, the user does not necessarily stop in a certain posture. For this reason, even if the user thinks that the user faces the moving direction, a difference corresponding to the angle θ formed by the moving direction and the direction of the face is caused. For this reason, the audio AR device 20 (20A, 20B) may provide an error range in which, even if a difference corresponding to the angle θ is caused, it is regarded as if the moving direction of the user and the direction of the user's face coincide with each other and the first determination unit 21 may be provided with a function of determining that the angle θ is 0 degrees when the angle θ is in the error range.

Figure 17:
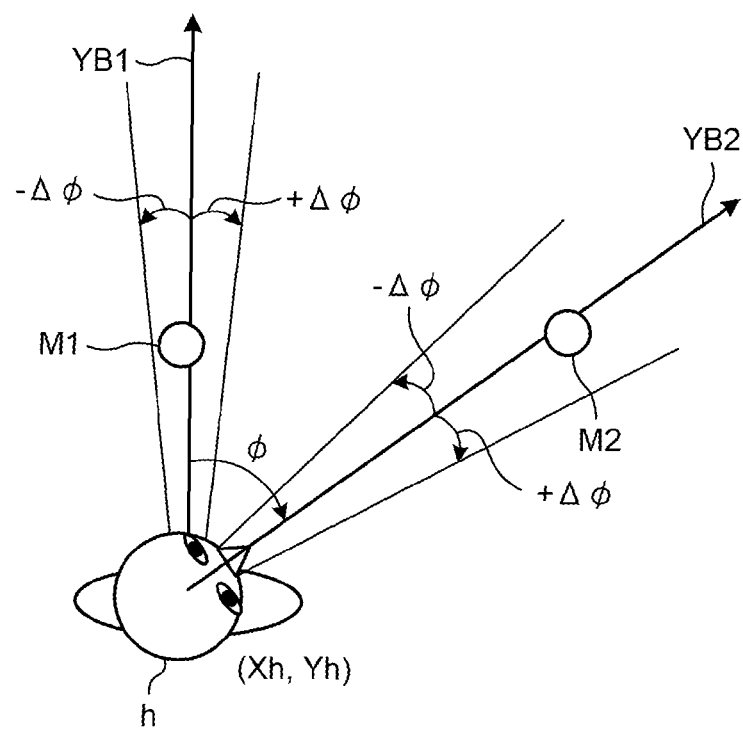
FIG. 17 illustrates an exemplary angle error range.

FIG. 17 illustrates an exemplary angle error range. As illustrated in FIG. 17, the audio AR device 20 determines whether the moving direction of the user h and the direction of the face of the user h coincide with the arrow YB1 and whether the angle θ formed by the moving direction and the face direction is within the predetermined angle error range of ±Δφ. The audio AR device 20 determines that the user is watching in the moving direction even if the angle θ formed by the moving direction and the face direction is not 0 degrees. When the angle θ is not in the error range, the audio AR device 20 determines that the user is not facing the moving direction and the direction of the face is the watching direction.

When the angle of the coordinates (Xh,Yh) of the position of the user h with respect to the moving direction of the user (the arrow YB1) is 0 degrees and the angle of the coordinates (Xh,Yh) with respect to the face pf the user is denoted by a watching direction angle φ, an angle range of ±Δφ may be set as a watched object range. According to the watched object range of the angle range of ±Δφ, the first determination unit 21 of the audio AR device 20 extracts the coordinates of an object within the watching object range based on the coordinates (Xh,Yh) of the user h and the direction of the face of the user h (the direction denoted by the arrow YB2).

When the first determination unit 21 extracts the coordinates of the position of the object within the watched object range of the watching direction, the first determination unit 21 determines the extracted object as an object that is watched. Accordingly, even if the watching direction does not perfectly coincide with the direction in which the object is present, the object can be determined as an object that is watched.

The components of each device illustrated in the drawings are not necessarily requested to be configured physically in the same manner as that illustrated in the drawings. In other words, specific separation and combination between the components are not limited to those illustrated in the drawings and each device may be configured by entirely or partly separating or combining the components functionally or physically according to various types of load or circumstances and according to an arbitrary unit.

Furthermore, all or an arbitrary part of the various processing functions implemented by each device may be implemented by a central processing unit (CPU) (or a microcomputer such as a micro processing unit (MPU) or a micro control unit (MCU)). Needless to say, all or an arbitrary part of various processing functions may be implemented by using a program that is analyzed and executed by the CPU (or a microcomputer such as a MPU or MCU) or by using wired logic hardware.

Figure 18:
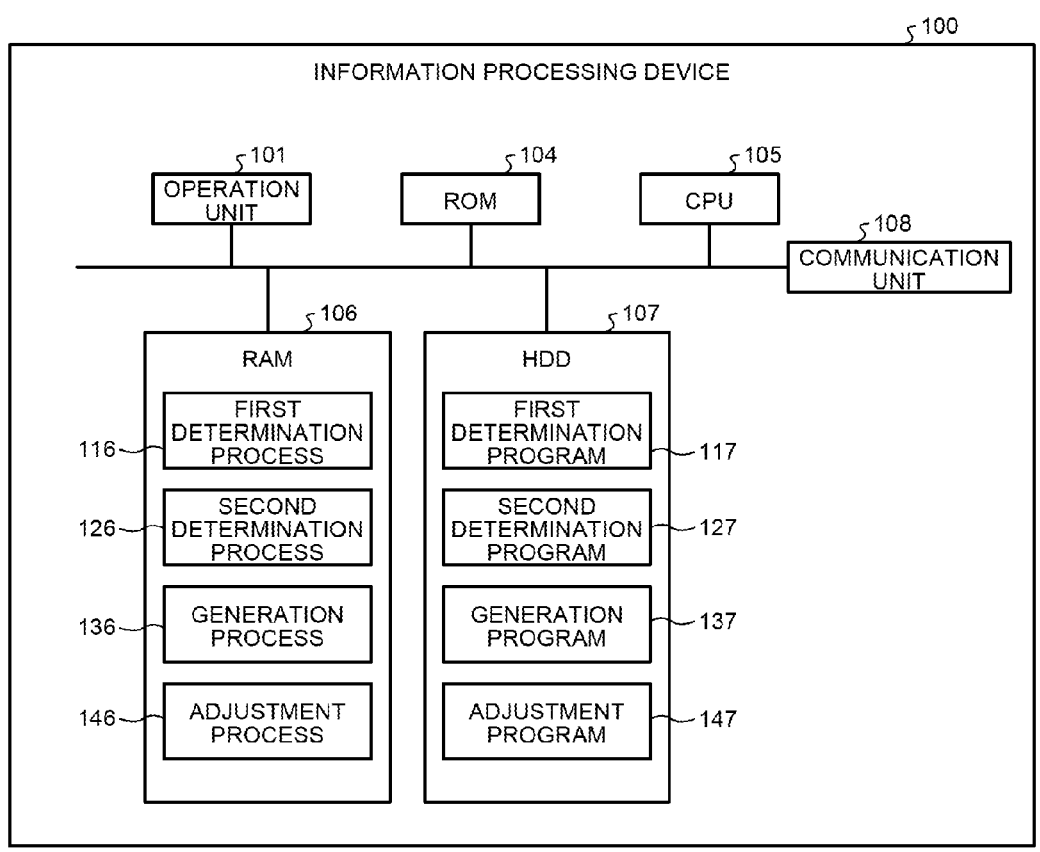
FIG. 18 illustrates an exemplary information processing device that executes an acoustic processing program.

The various types of processing illustrated in the embodiments may be implemented by causing an information processing device to execute a program that is prepared in advance. An exemplary information processing device that executes the program for implementing the same functions as those of the embodiments will be described below. FIG. 18 illustrates an exemplary information processing device that executes an acoustic processing program.

An information processing device 100 that executes the acoustic processing program includes an operation unit 101, a ROM 104, a CPU 105, a RAM 106, a HDD 107, and a communication unit 108.

The HDD 107 stores in advance the acoustic processing program that implements the same functions as those of the above-described embodiments. The acoustic processing program may be stored not in the HDD 107 but in the ROM 104. The recording medium that stores the acoustic processing program may be, for example, a portable recording medium, such as a CD-ROM, a DVD, an USB memory, and an SD card or a semiconductor memory such as a flash memory. As illustrated in FIG. 18, the acoustic processing program includes a first determination program 117, a second determination program 127, a generation program 137, and an adjustment program 147. The programs 117, 127, 137 and 147 may be combined or separated as appropriate.

The CPU 105 reads the programs 117, 127, 137 and 147 from the HDD 107 and executes the read programs in the RAM 106. As illustrated in FIG. 18, the CPU 105 executes the programs 117, 127, 137 and 147 to implement a first determination process 116, a second determination process 126, a generation process 136, and an adjustment process 146.

Based on the moving direction of a user and the direction of the body of the user, the CPU 105 determines an arbitrary object from among objects around the user as an object that is watched by the user. When a predetermined determination time elapses from the timing at which the object is determined as an object that is watched, the CPU 105 determines the watched object as a target. When the watched object is determined as the target, the CPU 105 generates output signals for outputting audio of a sound generator corresponding to the target in association with the position of the target. Based on the different between the moving direction of the user and the direction of the body of the user, the CPU 105 makes an adjustment to reduce the remaining time until when the predetermined determination time elapses. Accordingly, the target for which stereophonic acoustic guidance audio is requested can be determined quickly.

According to an aspect of the embodiments, a target for which stereophonic acoustic guidance audio is requested can be determined quickly.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An acoustic device comprising:
a memory; and
a processor coupled to the memory, wherein the processor executes a process including:
first determining, based on a state of a user, an arbitrary object from among objects around the user as an object that is watched by the user;
second determining the watched object as a target when a predetermined determination time elapses from a timing at which the arbitrary object is determined as the watched object;
generating, when the watched object is determined as the target, acoustic signals for outputting audio of a sound generator corresponding to the target in association with a position of the target; and
making, based on a difference between a moving direction of the user and a direction of a body of the user, an adjustment to reduce remaining time until when the predetermined determination time elapses.

2. The acoustic device according to claim 1, wherein
the making includes making, per predetermined cycle, an adjustment to reduce the remaining time and setting the adjusted remaining time as a new determination time, and
the second determining includes determining, when the new determination time that is set by the adjuster elapses, the watched object as the target.

3. The acoustic device according to claim 1, wherein the first determining includes determining, based on the moving direction of the user and the direction of the body of the user, the arbitrary object as the object that is watched by the user.

4. The acoustic device according to claim 3, wherein the making includes reducing, when an object positioned in a direction other than the moving direction is determined as the object that is watched by the user at the first determining, the remaining time based on the difference between the moving direction of the user and the direction of the body of the user.

5. The acoustic device according to claim 4, wherein the making includes reducing the remaining time based on an angle that is formed by the moving direction of the user and the direction of the body of the user.

6. The acoustic device according to claim 1, wherein
the process further includes setting coordinates of a position in which a sound generator corresponding to the object watched by the user is virtually oriented, and
the setting includes setting the coordinates of the position of the sound generator such that the sound generator corresponding to the watched object gets close to the user in accordance with the remaining time.

7. The acoustic device according to claim 1, wherein
the first determining includes determining, when a watching behavior of the user is detected, an object positioned in a direction other than the moving direction as an object that is watched by the user, and
the making includes further reducing the remaining time when the object positioned in the direction other than the moving direction is determined as the object that is watched by the watching behavior of the user at the first determining.

8. The acoustic device according to claim 7, wherein the first determining includes detecting, as the watching behavior of the user, a behavior of stopping while moving in the moving direction of the user.

9. The acoustic device according to claim 7, wherein the first determining includes detecting, as the watching behavior of the user, a behavior with which a distance between a hand of the user and an ear of the user is made shorter than a predetermined distance.

10. An acoustic system comprising: a terminal device that is carried by a user; and an acoustic device that provides the terminal device with acoustic signals including audio from a sound generator corresponding to an object around the user, wherein the terminal device includes: a memory; and a processor coupled to the memory, wherein the processor executes a process including: detecting a state of the user; and outputting the acoustic signals, and the acoustic device includes: a second memory; and a second processor coupled to the second memory, wherein the second processor executes a process including: first determining, based on the state of the user, an arbitrary object from among objects around the user as an object that is watched by the user; second determining the watched object as a target when a predetermined determination time elapses from a timing at which the arbitrary object is determined as the watched object; generating, when the watched object is determined as the target, acoustic signals for outputting audio of a sound generator corresponding to the target in association with a position of the target; and making, based on a difference between a moving direction of the user and a direction of a body of the user, an adjustment to reduce remaining time until when the predetermined determination time elapses.

11. An acoustic processing method comprising:
first determining, based on a state of a user, an arbitrary object from among objects around the user as an object that is watched by the user, using a processor;
second determining the watched object as a target when a predetermined determination time elapses from a timing at which the arbitrary object is determined as the watched object, using the processor;
when the watched object is determined as the target, generating acoustic signals for outputting audio of a sound generator corresponding to the target in association with a position of the target, using the processor; and
based on a difference between a moving direction of the user and a direction of a body of the user, making an adjustment to reduce remaining time until when the predetermined determination time elapses, using the processor.

12. A non-transitory computer-readable recording medium having stored therein a program that causes a computer to execute an acoustic process comprising:
first determining, based on a state of a user, an arbitrary object from among objects around the user as an object that is watched by the user;
second determining the watched object as a target when a predetermined determination time elapses from a timing at which the arbitrary object is determined as the watched object;
when the watched object is determined as the target, generating acoustic signals for outputting audio of a sound generator corresponding to the target in association with a position of the target; and
based on a difference between a moving direction of the user and a direction of a body of the user, making an adjustment to reduce remaining time until when the predetermined determination time elapses.

* * * * *